United States Patent
Yen et al.

(10) Patent No.: US 9,727,994 B2
(45) Date of Patent: Aug. 8, 2017

(54) IMAGE JOINING METHOD

(71) Applicant: TECO IMAGE SYSTEMS CO., LTD., Taipei (TW)

(72) Inventors: Yi-Chun Yen, Taipei (TW); Ko-Meng Chen, Taipei (TW); Kurt Eugene Spears, Fort Collins, CO (US)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 0 days.

(21) Appl. No.: 14/968,565

(22) Filed: Dec. 14, 2015

(65) Prior Publication Data
US 2017/0116768 A1    Apr. 27, 2017

(30) Foreign Application Priority Data
Oct. 27, 2015    (TW) .............................. 104135184 A

(51) Int. Cl.
*G06K 9/46*    (2006.01)
*G06T 11/60*    (2006.01)
(Continued)

(52) U.S. Cl.
CPC ................ *G06T 11/60* (2013.01); *G06K 9/52* (2013.01); *G06T 7/003* (2013.01);
(Continued)

(58) Field of Classification Search
CPC .................. G06T 11/60; G06T 7/003; G06T 2207/20021; G06T 2207/20221; G06K 9/52; G06K 2009/4666
See application file for complete search history.

(56) References Cited

U.S. PATENT DOCUMENTS 5,680,150 A * 10/1997 Shimizu ................ G06T 3/0081
                                                               345/634
2004/0240754 A1* 12/2004 Smith ..................... G01B 11/00
                                                               382/286
(Continued)

FOREIGN PATENT DOCUMENTS

CN    101866096    10/2010
CN    104125392    10/2014
(Continued)

*Primary Examiner* — Amara Abdi
(74) *Attorney, Agent, or Firm* — Kirton McConkie; Evan R. Witt

(57) ABSTRACT

An image jointing method includes steps of obtaining a first image, a second image including a line image, and a displacement data, dividing a specific region of the line image as image blocks and calculating to obtain feature values corresponded to the image blocks, comparing the feature values and utilizing an initial coordinate of the image block corresponding to the maximum of the feature values as a feature point representing the line image, corresponding the feature point to a base point of the first image according to the displacement data and obtaining a first jointing point corresponding to the first image and a second jointing point corresponding to the second image according to the base point and the feature point, and jointing the first image and the second image through the first jointing point and the second jointing point, thereby significantly reducing the operation time and enhancing the user experiences.

8 Claims, 5 Drawing Sheets

(51) Int. Cl.
*G06T 7/00* (2017.01)
*G06K 9/52* (2006.01)

(52) U.S. Cl.
CPC ............... *G06K 2009/4666* (2013.01); *G06T 2207/20021* (2013.01); *G06T 2207/20221* (2013.01)

(56) References Cited

U.S. PATENT DOCUMENTS

| | | | |
|---|---|---|---|
| 2007/0279705 A1* | 12/2007 | Takiyama | G06K 15/02 358/453 |
| 2011/0135148 A1* | 6/2011 | Hsiao | G06T 7/248 382/103 |
| 2012/0274739 A1 | 11/2012 | Li | |
| 2015/0010247 A1* | 1/2015 | Tanaka | H04N 1/409 382/254 |
| 2016/0005229 A1* | 1/2016 | Lee | G06F 3/0488 345/419 |

FOREIGN PATENT DOCUMENTS

| | | |
|---|---|---|
| CN | 104205804 | 12/2014 |
| CN | 104680501 | 6/2015 |
| CN | 104991733 | 10/2015 |
| TW | 201443393 | 11/2014 |
| TW | 201533707 | 9/2015 |

\* cited by examiner

IMAGE JOINING METHOD

CROSS-REFERENCE TO RELATED APPLICATION

This application claims priority from Taiwan Patent Application No. TW104135184, filed on Oct. 27, 2015, the entire contents of which are incorporated herein by reference for all purposes.

FIELD OF THE INVENTION

The present invention relates to an image joining method, and more particularly to an image joining method that joins a first image and a second image.

BACKGROUND OF THE INVENTION

In the modern societies, people are increasingly dependent on handheld devices such as smart phones or tablet computers. Consequently, the demands on digitalized documents become stronger. After paper-type documents are digitalized through an imaging capturing process such as a scanning process or photographing process, the documents are converted into digital files. Portable image capturing devices such as portable scanners gradually become the mainstream product in the market because they are portable and available for using at anytime.

Generally, the common portable scanners have smaller volumes. When a common portable scanner is applied to scan a document or a picture, usually the document or the picture cannot be completely scanned in once of scanning. That is, an image joining operation is needed to join the images scanned in several times.

However, the conventional image joining method usually calculates the segmented images respectively captured in several times to find the image alignments for joining. Since most image alignments are compared and found out at each position on each segmented image, the operation time of the calculation is long. Meanwhile, the image alignments may be required to be determined by the users, thus causing a waste of time and a bad user experience.

Therefore, there is a need of providing an image joining method distinct from the prior art in order to reduce the operation time, enhance the user experiences and solve the above drawbacks.

SUMMARY OF THE INVENTION

Some embodiments of the present invention are to provide an image joining method in order to overcome at least one of the above-mentioned drawbacks encountered by the prior arts.

The present invention provides an image joining method. By the first image, the second image, and the displacement data obtained during capturing the first image and the second image, the operation time of the image joining is significantly reduced, and the user experiences are enhanced.

The present invention also provides an image joining method. Since the displacement data is utilized as an accordance of calculating the scaling ratio, a plurality of pixels are appropriately added into the first image and the second image for enhancing result of the image joining. Furthermore, the difference of color scales is calculated for making the image joining position as gradient color scales, such that the joined image becomes more natural.

In accordance with an aspect of the present invention, there is provided an image joining method. The image joining method includes steps of obtaining a first image, a second image and a displacement data, in which the second image includes at least a line image, dividing a specific region of the line image as a plurality of image blocks and calculating to obtain a plurality of feature values, in which each of the feature values is corresponded to each of the image blocks, comparing the feature values and utilizing an initial coordinate of the image block corresponding to the maximum of the feature values as a feature point representing the line image, corresponding the feature point to a base point of the first image according to the displacement data and obtaining a first joining point corresponding to the first image and a second joining point corresponding to the second image according to the base point and the feature point, and joining the first image and the second image through the first joining point and the second joining point.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides an image joining method. It should be noted that the image joining method shown in the following embodiments are preferred to be applied to join a first image and a second image, which are captured by a U-shaped image capturing method, but not limited thereto. For example, the first image is captured along a vertical direction, the image capturing device is then moved along a horizontal direction for a specific distance, and the second image is further captured along a direction in reverse to the vertical direction. The first image and the second image are at least partially overlapped, but not limited thereto. Certainly, any image capturing method utilized to capture a first image and a second image and record a displacement data is taught by the present invention.

Figure 1:
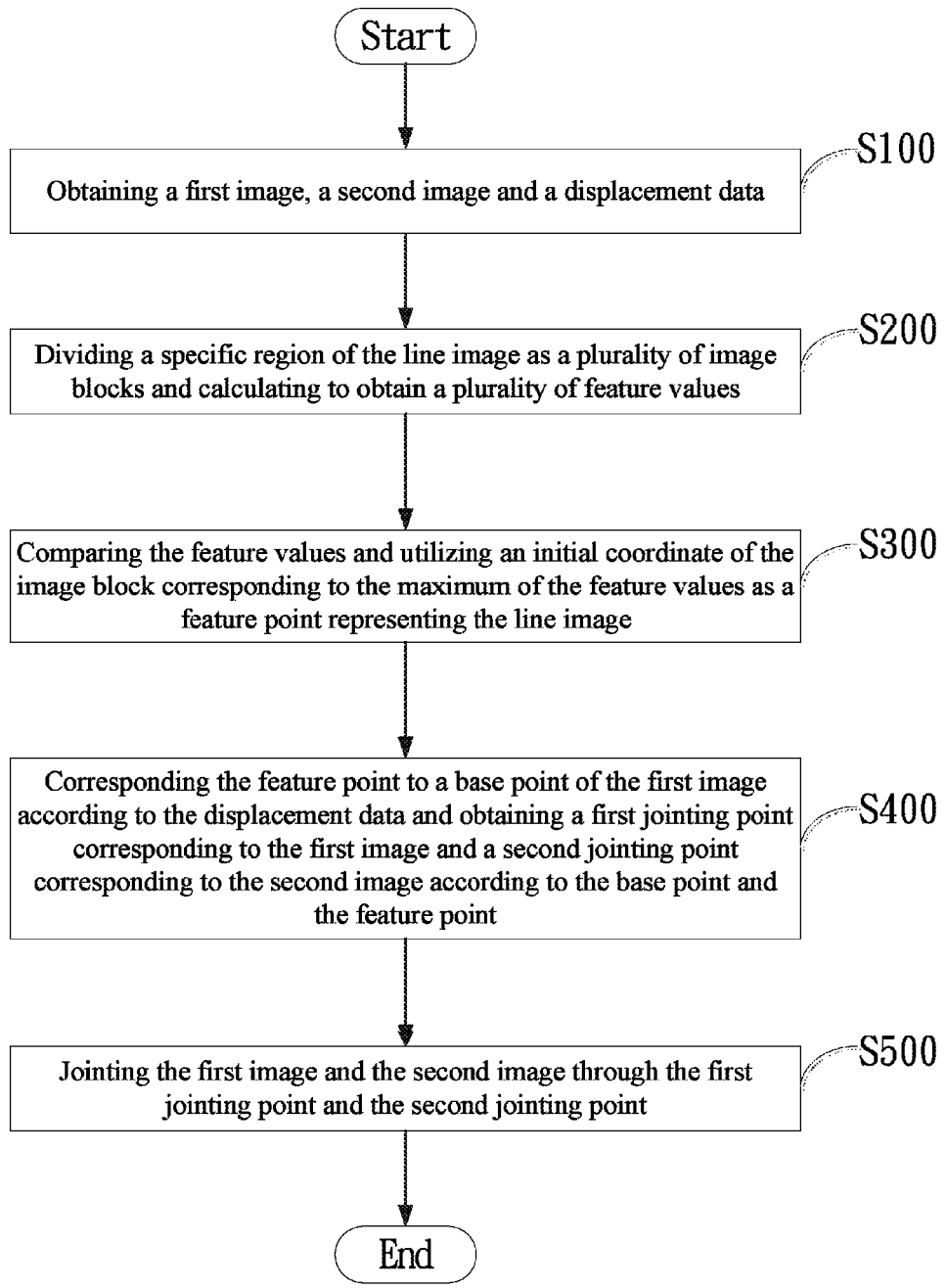
FIG. 1 schematically illustrates the flow chart of an image joining method according to an embodiment of the present invention.

Please refer to FIG. 1. FIG. 1 schematically illustrates the flow chart of an image joining method according to an embodiment of the present invention. As shown in FIG. 1 an image joining method of the present invention includes steps as follows. The flow chart of the image joining method begins at the step S100. As shown in the step S100, obtaining a first image, a second image and a displacement data. The second image includes at least a line image. In some embodiments, the step S100 can be implemented by allowing a control unit of an image capturing device to load the first image, the second image and the displacement data, but not limited thereto.

Next, as shown in the step S200, dividing a specific region of the line image as a plurality of image blocks and calculating to obtain a plurality of feature values, in which each of the feature values is corresponded to each of the image blocks. Then, as shown in the step S300, comparing the feature values and utilizing an initial coordinate of the image block corresponding to the maximum of the feature values as a feature point representing the line image. The initial coordinate is the coordinate of the most left top coordinate point of the corresponded image block. Next, as shown in the step S400, corresponding the feature point to a base point of the first image according to the displacement data and obtaining a first joining point corresponding to the first image and a second joining point corresponding to the second image according to the base point and the feature point. Then, as shown in the step S500, joining the first image and the second image through the first joining point and the second joining point. Therefore, by the first image, the second image, and the displacement data obtained during capturing the first image and the second image, the operation time of the image joining is significantly reduced, and the user experiences are enhanced.

Figure 2:
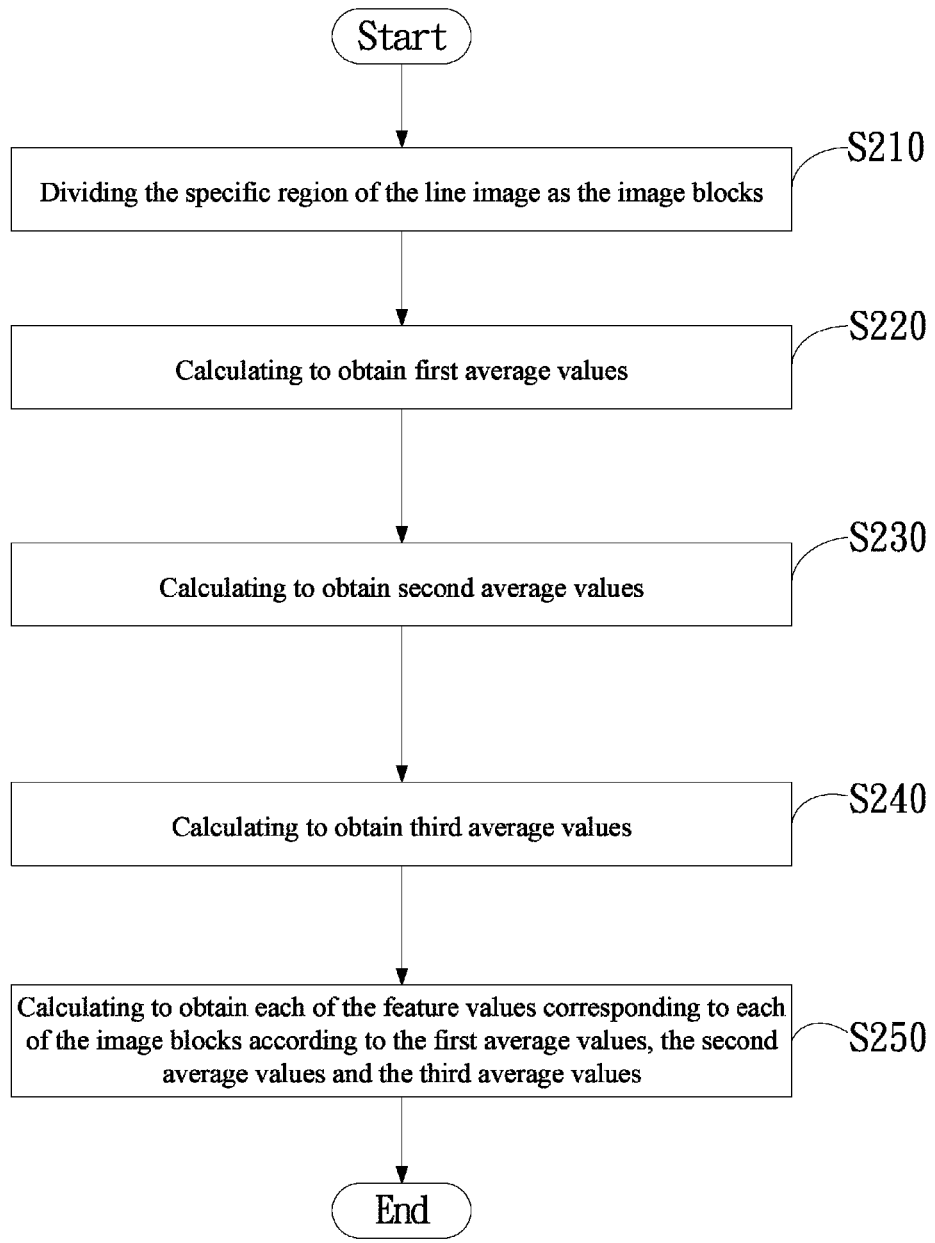
FIG. 2 schematically illustrates the detailed flow chart of the step S200 shown in FIG. 1.

Please refer to FIG. 2. FIG. 2 schematically illustrates the detailed flow chart of the step S200 shown in FIG. 1. As shown in FIG. 2, the step S200 of the image joining method of the present invention may further includes sub-steps as follows. At first, dividing the specific region of the line image as the image blocks as shown in the step S210. For example, dividing the previous 300 pixels of each line image as a plurality of image blocks each having width as 10 pixels. Next, as shown in the step S220, calculating to obtain first average values, in which each of the first average values is corresponded to each of the image blocks, and each first average value is an average of all color scales and color scale distribution averages of each image block. Then, as shown in the step S230, calculating to obtain second average values, in which each of the second average values is corresponded to each of the image blocks, and each second average value is average of the differences between every coordinate point and the next coordinate point on the right side of each image block. Next, as shown in the step S240, calculating to obtain third average values, in which each of the third average values is corresponded to each of the image blocks, and each third average value is an an average of the differences between every coordinate point and the next coordinate point on the underside of each image block. Then, as shown in the step S250, calculating to obtain each of the feature values corresponding to each of the image blocks according to the first average values, the second average values and the third average values. Each of the feature value is equal to a sum of the corresponded first average value, two times of the corresponded second average value and two times of the corresponded third average value (i.e. Feature value=First average value+2(Second average value+Third average value))

In some embodiments, the displacement data includes a horizontal displacement data and a vertical displacement data. An area of the specific region is determined according to the horizontal displacement data. In particular, through the horizontal displacement data, the area of the overlapped portion of the first image and the second image can be effectively known, hence only the overlapped portion of the first image and the second image is image-divided and computed, thereby significantly reducing the total computing time.

Figure 3:
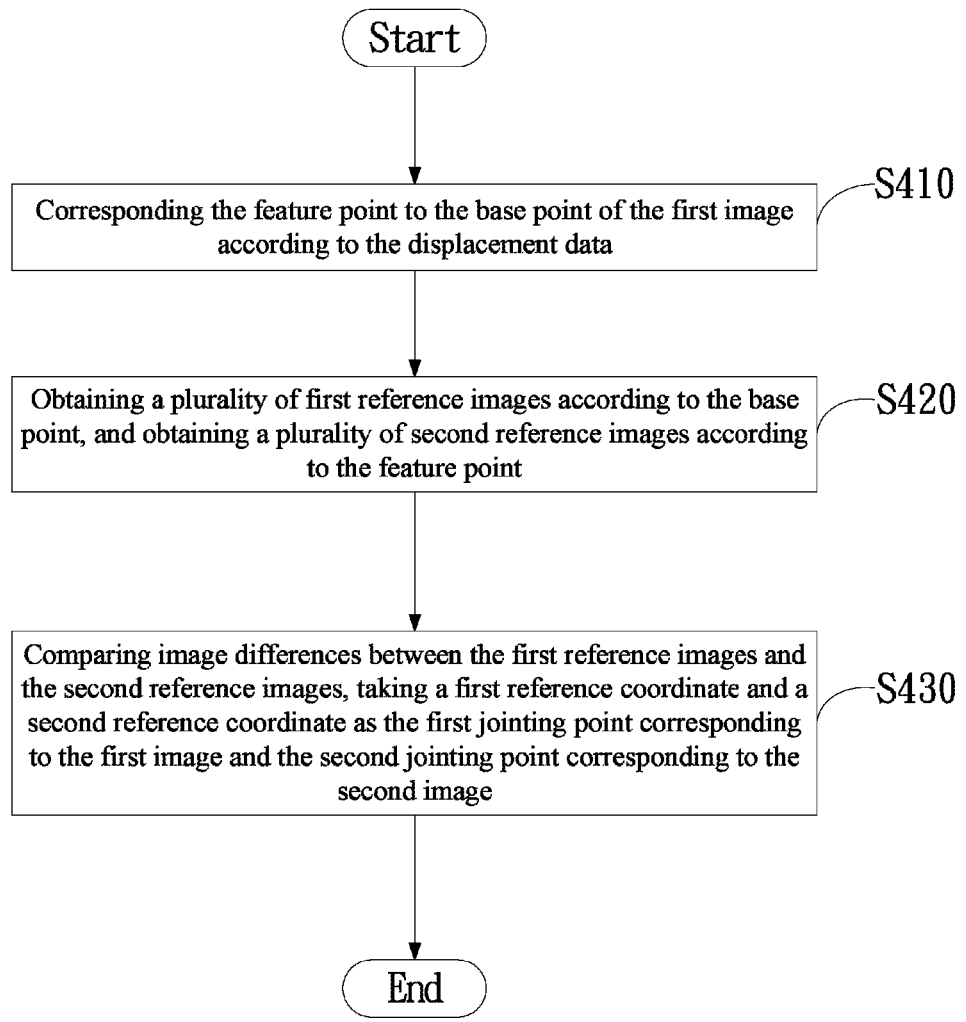
FIG. 3 schematically illustrates the detailed flow chart of the step S400 shown in FIG. 1.

Please refer to FIG. 3. FIG. 3 schematically illustrates the detailed flow chart of the step S400 shown in FIG. 1. As shown in FIG. 3, the step S400 of the image joining method of the present invention may further includes sub-steps as follows. At first, corresponding the feature point to the base point of the first image according to the displacement data as shown in the step S410. Next, as shown in the step S420, obtaining a plurality of first reference images according to the base point, and obtaining a plurality of second reference images according to the feature point.

In some embodiments, in the step S420, the first reference images are the images corresponding to the base point and every coordinate points at a distance within a coordinate range from the base point, and the second reference images are the images corresponding to the feature point and every coordinate points at a distance within the coordinate range from the feature point. The coordinate range is for example 120 pixels in a horizontal direction and 60 pixels in a vertical direction, and an area of each of the first reference images and the second reference images is for example 25 pixels*25 pixels (i.e. 625 pixels$^2$), but not limited thereto.

Next, as shown in the step S430, comparing image differences between the first reference images and the second reference images, taking a first reference coordinate and a second reference coordinate, which are respectively corresponded to the first reference image and the second reference image corresponding to the minimum of the image differences, as the first joining point corresponding to the first image and the second joining point corresponding to the second image.

Figure 4:
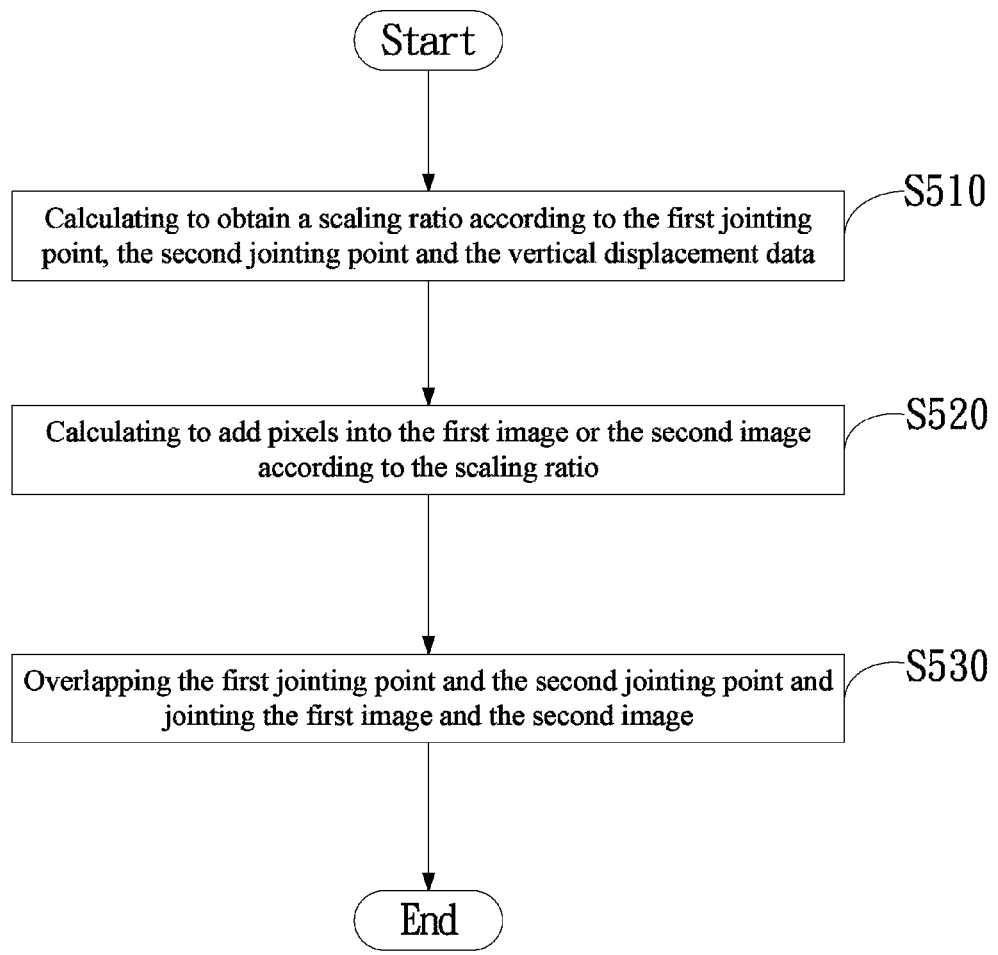
FIG. 4 schematically illustrates the detailed flow chart of the step S500 shown in FIG. 1.

Please refer to FIG. 4. FIG. 4 schematically illustrates the detailed flow chart of the step S500 shown in FIG. 1. As shown in FIG. 4, the step S500 of the image joining method of the present invention may further includes sub-steps as follows. As shown in the step S510, calculating to obtain a scaling ratio according to the first joining point, the second joining point and the vertical displacement data. Since the speeds of operating the image capturing device of users are not always the same, the heights of the images captured in unit times may be different. By utilizing the vertical displacement data, the scaling ratio required for adjusting the first image and the second image for joining can be obtained through calculating. Since the scaling ratio is not necessarily an integer, the scaling ratio is preferred to be assumed as an average of the upper limit and the lower limit, but not limited thereto. Next, as shown in the step S520, calculating to add pixels into the first image or the second image according to the scaling ratio (i.e. processing a point-filling or pixel-filling operation). Then, as shown in the step S530, overlapping the first joining point and the second joining point and joining the first image and the second image. It should be noted that the first image and the second image described herein are the first image and/or the second image corrected through a zoom-in or a zoom-out adjustment.

Figure 5:
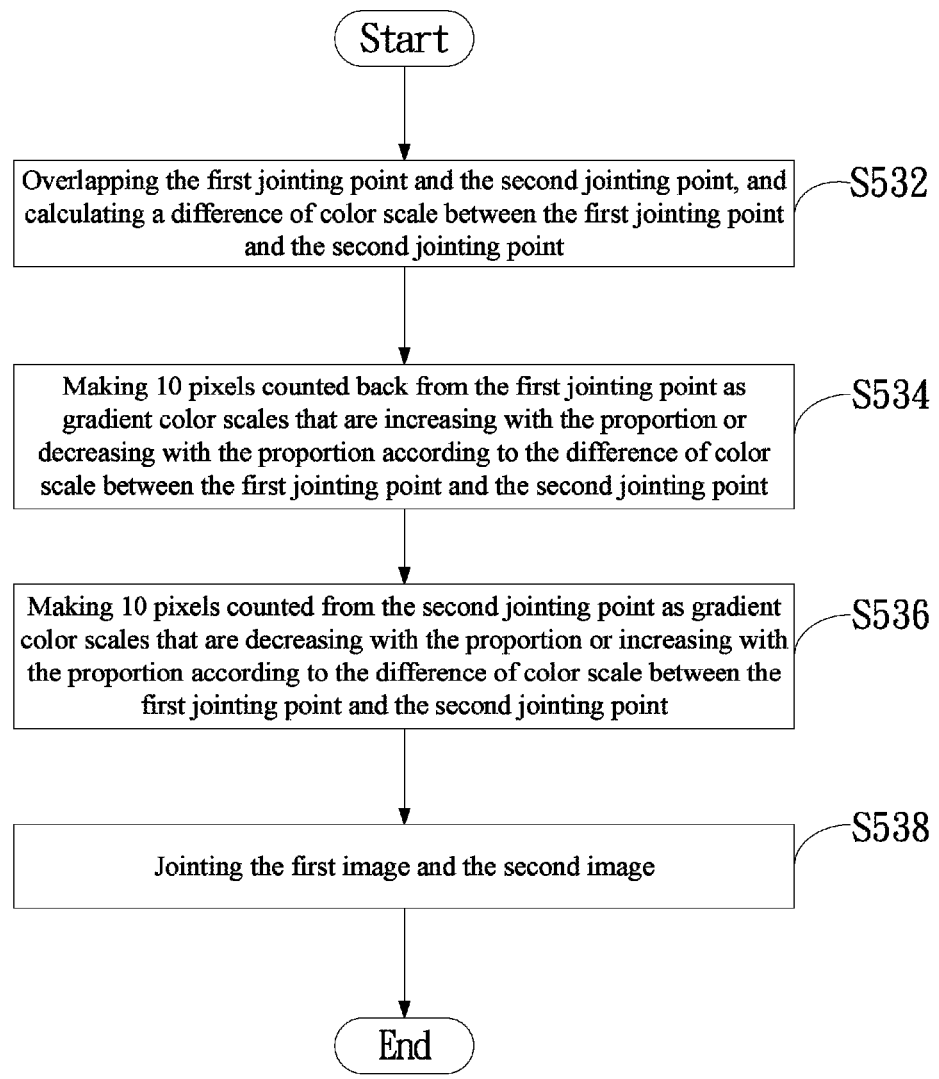
FIG. 5 schematically illustrates the detailed flow chart of the step S530 shown in FIG. 4.

For avoiding the fault color scales, a manner of mixing gradient color scales is utilized by the present invention since the first image and the second image are practically two different images. On the joining edge, the manner of mixing gradient color scales is utilized for optimizing the joined image. Please refer to FIG. 5. FIG. 5 schematically illustrates the detailed flow chart of the step S530 shown in FIG. 4. As shown in FIG. 5, the step S530 of the image joining method of the present invention may further includes sub-steps as follows. At first, overlapping the first joining point and the second joining point, and calculating a difference of color scale between the first joining point and the second joining point as shown in the step S532 Next, as shown in the step S534, making 10 pixels counted back from the first joining point as gradient color scales that are increasing with the proportion or decreasing with the proportion according to the difference of color scale between the first joining point and the second joining point. Then, as shown in the step S536, making 10 pixels counted from the second joining point as gradient color scales that are decreasing with the proportion or increasing with the proportion according to the difference of color scale between the first joining point and the second joining point. Finally, as shown in the step S538, joining the first image and the second image.

In this embodiment, when the gradient color scales made in the step S534 are increasing with the proportion, the gradient color scales made in the step S536 are decreasing with the proportion. On the contrary, when the gradient color scales made in the step S534 are decreasing with the proportion, the gradient color scales made in the step S536 are increasing with the proportion. Therefore, the color scales of the first image and the second image becomes closer to each other, and further the joined image becomes more natural.

In brief, the main idea provided by the joining image method of the present invention is to simply and quickly correspond and join a left image and a right image (i.e. the first image and the second image) at the to-be-joined position in an error tolerance according to a displacement data. The displacement data is obtained during capturing of for example an optical navigation sensor. In particular, the displacement amount of each line is recorded during capturing, and the shift amount (i.e. the left-shift or the right-shift) of each line is sequentially accumulated after capturing. Meanwhile, the move amount or error amount caused by a user can be also recorded. After integrating the amounts mentioned above, the displacement data is obtained. Since it is not necessary to compare or search the total image, the operation time of image joining is effectively reduced in comparison with prior art.

From the above description, the present invention provides an image joining method. By the first image, the second image, and the displacement data obtained during capturing the first image and the second image, the operation time of the image joining is significantly reduced, and the user experiences are enhanced. Meanwhile, since the displacement data is utilized as an accordance of calculating the scaling ratio, a plurality of pixels are appropriately added into the first image and the second image for enhancing result of the image joining. Furthermore, the difference of color scales is calculated for making the image joining position as gradient color scales, such that the joined image becomes more natural.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. an image joining method, comprising steps of:
   (a) obtaining a first image, a second image and a displacement data, wherein the second image comprises at least a line image, and the displacement data comprises a horizontal displacement data and a vertical displacement data;
   (b) dividing a specific region of the line image as a plurality of image blocks and calculating to obtain a plurality of feature values, wherein each of the feature values is corresponded to one of the image blocks, and the amount of the feature values is equal to the amount of the image blocks;
   (c) comparing the feature values of the image blocks and utilizing an initial coordinate of the image block corresponding to the maximum of the feature values as a feature point representing the line image;
   (d) corresponding the feature point to a base point of the first image according to the displacement data and obtaining a first joining point corresponding to the first image and a second joining point corresponding to the second image according to the base point and the feature point; and
   (e) jointing the first image and the second image through the first joining point and the second joining point, wherein the step (e) further comprises sub-steps of:
   (e1) calculating to obtain a scaling ratio according to the first joining point, the second joining point and the vertical displacement data;
   (e2) calculating to add pixels into the first image or the second image according to the scaling ratio; and
   (e3) overlapping the first joining point and the second joining point and joining the first image and the second image.

2. The image joining method according to claim 1, wherein the step (b) comprises sub-steps of:
   (b1) dividing the specific region of the line image as the image blocks;
   (b2) calculating to obtain first average values, wherein each of the first average values is corresponded to each of the image blocks, and each first average value is an average of all color scales and color scale distribution averages of each image block;
   (b3) calculating to obtain second average values, wherein each of the second average values is corresponded to each of the image blocks, and each second average value is an average of the differences between every coordinate point and the next coordinate point on the right side of each image block;
   (b4) calculating to obtain third average values, wherein each of the third average values is corresponded to each of the image blocks, and each third average value is an average of the differences between every coordinate point and the next coordinate point on the underside of each image block; and
   (b5) calculating to obtain each of the feature values corresponding to each of the image blocks according to the first average values, the second average values and the third average values, wherein each of the feature value is equal to a sum of the corresponded first average value, two times of the corresponded second average value and two times of the corresponded third average value.

3. The image joining method according to claim 1, wherein the initial coordinate is the coordinate of the most left top coordinate point of the corresponded image block.

4. The image joining method according to claim 1, wherein the step (d) comprises sub-steps of:
(d1) corresponding the feature point to the base point of the first image according to the displacement data;
(d2) obtaining a plurality of first reference images according to the base point, and obtaining a plurality of second reference images according to the feature point; and
(d3) comparing image differences between the first reference images and the second reference images, taking a first reference coordinate and a second reference coordinate, which are respectively corresponded to the first reference image and the second reference image corresponding to the minimum of the image differences, as the first joining point corresponding to the first image and the second joining point corresponding to the second image.

5. The image joining method according to claim 4, wherein in the sub-step (d2), the first reference images are the images corresponding to the base point and every coordinate points at a distance within a coordinate range from the base point, and the second reference images are the images corresponding to the feature point and every coordinate points at a distance within the coordinate range from the feature point.

6. The image joining method according to claim 5, wherein the coordinate range is 120 pixels in a horizontal direction and 60 pixels in a vertical direction, and an area of each of the first reference images and the second reference images is 25 pixels*25 pixels.

7. The image joining method according to claim 1, wherein the sub-step (e3) further comprises sub-steps of:
(e31) overlapping the first joining point and the second joining point, and calculating a difference of color scale between the first joining point and the second joining point;
(e32) making 10 pixels counted back from the first joining point as gradient color scales that are increasing with the proportion or decreasing with the proportion according to the difference of color scale between the first joining point and the second joining point;
(e33) making 10 pixels counted from the second joining point as gradient color scales that are decreasing with the proportion or increasing with the proportion according to the difference of color scale between the first joining point and the second joining point; and
(e34) the first image and the second image.

8. The image joining method according to claim 1, wherein an area of the specific region is determined according to the horizontal displacement data.

* * * * *